No. 774,080. PATENTED NOV. 1, 1904.
E. C. JORDAN.
WATER GAGE.
APPLICATION FILED FEB. 1, 1904.
NO MODEL.
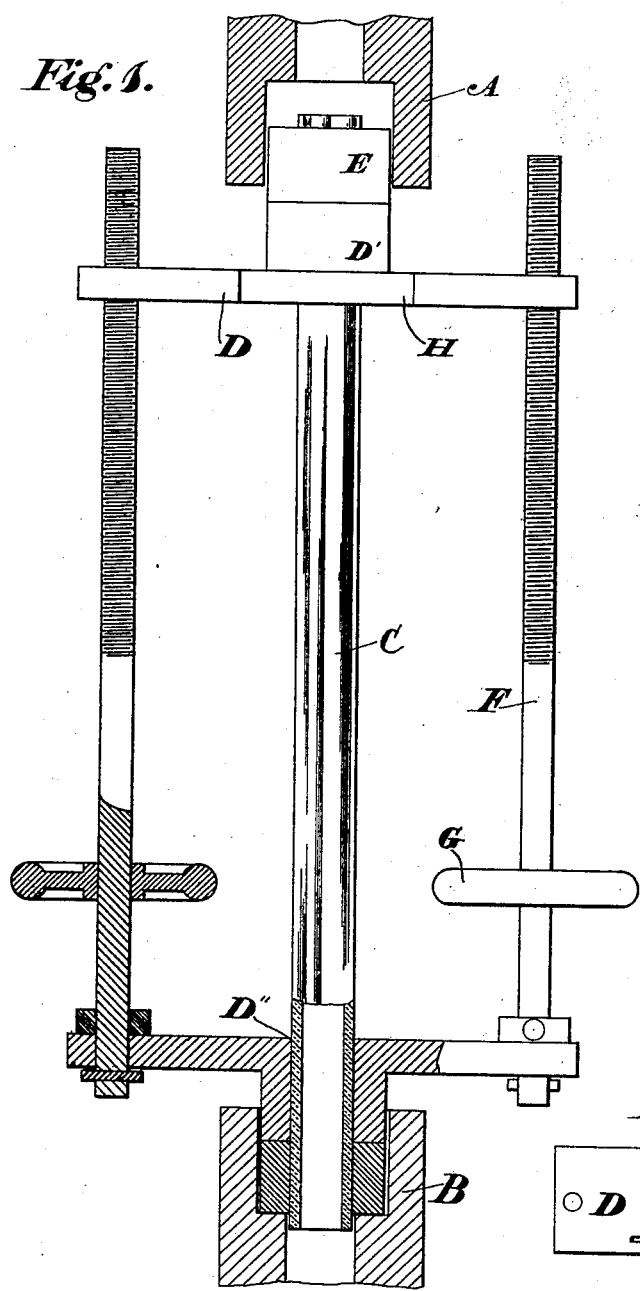
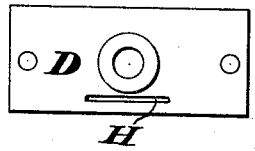
Witnesses
Inventor.
Elmore C Jordan
by Hazard & Harpham
Attorneys.

No. 774,080.

Patented November 1, 1904.

UNITED STATES PATENT OFFICE.

ELMORE C. JORDAN, OF LOS ANGELES, CALIFORNIA.

WATER-GAGE.

SPECIFICATION forming part of Letters Patent No. 774,080, dated November 1, 1904.

Application filed February 1, 1904. Serial No. 191,619. (No model.)

*To all whom it may concern:*

Be it known that I, ELMORE C. JORDAN, a citizen of the United States, residing at Los Angeles, in the county of Los Angeles and State of California, have invented new and useful Improvements in Water-Gages, of which the following is a specification.

My invention relates to a water-gage for steam-boilers; and the object thereof is to provide simple and efficient means to secure the glass in the gage whereby the same may be easily replaced in case a glass is broken when the boiler is in use.

In the water-gages in common use for steam-boilers the gage-glass is usually secured to the metallic tubes connecting with the boiler by means of a coupling-nut which is screwed upon the end of the tube connecting with the boiler, thereby pressing a gland upon the packing-ring which surrounds the end of the glass to make a tight joint between the end of the tube and the glass. These nuts must be operated by means of a wrench, and when a glass breaks when a boiler is in use they are very hot, and oftentimes the packing-ring which surrounds the end of the glass is too thick to permit of this nut catching quickly upon the threads on the ends of the metallic tube, and in all cases the nut must be handled with the fingers until it is started upon the end of the metallic tube. This causes considerable loss of time and is a great annoyance to the operator when the packing-ring does not fit and has to be taken out and cut down in order to permit the nut to be screwed upon the end of the tube that connects with the boiler. With my improved water-gage this trouble and annoyance is avoided.

In the drawings, Figure 1 is a side elevation of my improved water-gage, partly in section, with a fragment of the metallic tubes shown in section whereby the same is connected to the boiler. Fig. 2 is a plan of one of the binding-plates.

A and B represent fragments of the end of the metallic tubes which connect with the boiler (not shown) and between which the water-glass C is held.

D is a metallic binding-plate, of which there is one at each end of the glass, as shown in Fig. 1, each of which is provided with a boss D', which passes up into the end of the metallic tube and compresses the rubber washers E, which surround the ends of the glass until a steam-tight joint is made between the glass and the tube. These plates are connected together by the operating-rods F, one end of which is threaded and passes in threaded contact through one of the plates. The other end of these rods is secured to the other plate and is revoluble therein. To these rods are secured the operating-wheels G, by means of which they are rotated to cause the movement of the binding-plates toward and from each other.

In assembling the parts together the plates are brought close enough together so that the bosses thereof will pass between the ends of the metallic tubes which are connected to the boiler. The water-glass is then slipped through the central hole D'', after which the rubber gaskets or washers are slipped over the exterior ends of the glass, and the same is then placed in the ends of the metallic tubes in the usual manner. The operating-wheels are then rotated to cause the separation of the plates, thereby forcing the bosses thereon into the ends of the metallic tubes until they compress the rubber washers or gaskets sufficiently to form a steam-tight joint between the glass and said tubes. From this construction it will be seen that a simple and efficient device is provided to secure the glass in a water-gage which permits the same to be secured therein without having to handle any of the heated parts of the gage to secure their perfect alinement, as they may be assembled and the cooler parts handled to put them in position to be secured to the other parts.

In the front edge of the top binding-plate I provide a slot H, as shown in Fig. 2, so that a shield (not shown) may be placed therein to secure the engineer from injury in case the glass breaks when he is looking at the same.

Having described my invention, what I claim as new, and desire to secure by Letters Patent, is—

1. In a water-gage the herein-described means for securing the glass therein comprising tubes at the top and bottom thereof, binding-plates at the top and bottom thereof, said binding-plates having bosses adapted to project into the tubes; rods connecting said binding-plates, said rods being revoluble therein and passing through one of said plates in threaded contact and being adapted by the rotation thereof to cause said plates to move toward or from each other.

2. In a water-gage the herein-described means for securing a glass therein comprising tubes at the top and bottom thereof, binding-plates at the top and bottom thereof, said binding-plates having bosses adapted to project into the tubes; rods connecting said binding-plates, said rods being revoluble in said binding-plates, and passing through one of said plates in threaded contact therewith and being adapted by the rotation thereof to cause said plates to move toward or from each other; means secured upon said rods whereby the same may be rotated.

3. In a water-gage comprising metallic tubes adapted to be secured to a boiler; a water-glass adapted to pass into the ends of said tubes, gaskets surrounding the ends of said glass, said gaskets being adapted to pass into said metallic tubes and be compressed therein to form a steam-tight joint between the metallic tube and the glass; binding-plates having bosses surrounding the ends of said glass; operating-rods revolubly secured to one of said binding-plates and passing through the other binding-plate in screw-threaded contact therewith; means to rotate said operating-rods to cause said bosses on the binding-plates to compress the washers on the ends of the glass.

In witness that I claim the foregoing I have hereunto subscribed my name this 23d day of January, 1904.

ELMORE C. JORDAN.

Witnesses:
G. E. HARPHAM,
MARGARETE C. NICKELESON.